Dec. 14, 1948. W. P. SPAIN 2,456,031
ARTICLE ARRANGING AND ADVANCING CONVEYER MECHANISM
Filed April 10, 1946 2 Sheets-Sheet 1
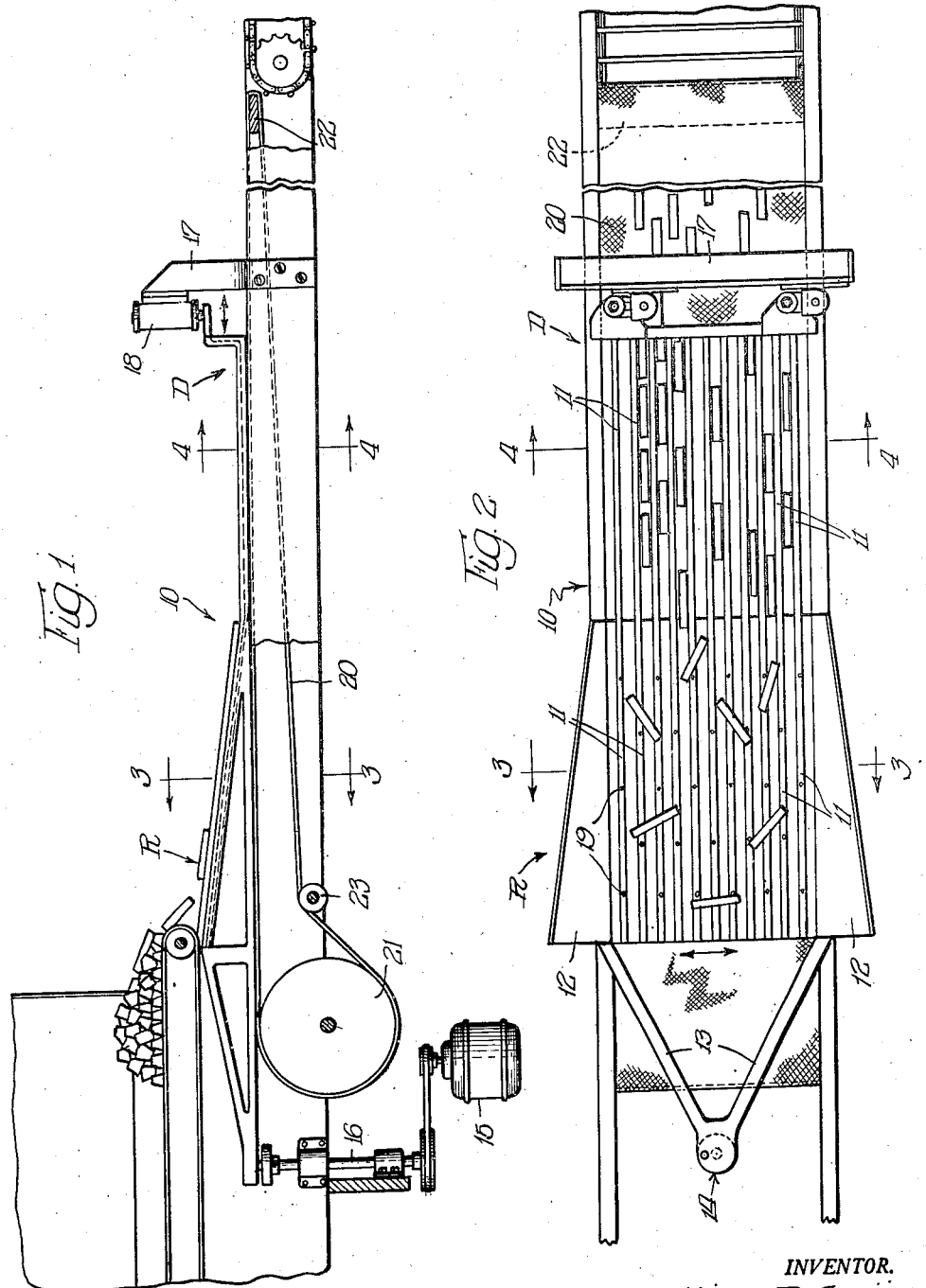
INVENTOR.
William P. Spain.
BY
Cromwell, Greist & Warden
ATTYS.

Dec. 14, 1948. W. P. SPAIN 2,456,031
ARTICLE ARRANGING AND ADVANCING CONVEYER MECHANISM
Filed April 10, 1946 2 Sheets-Sheet 2
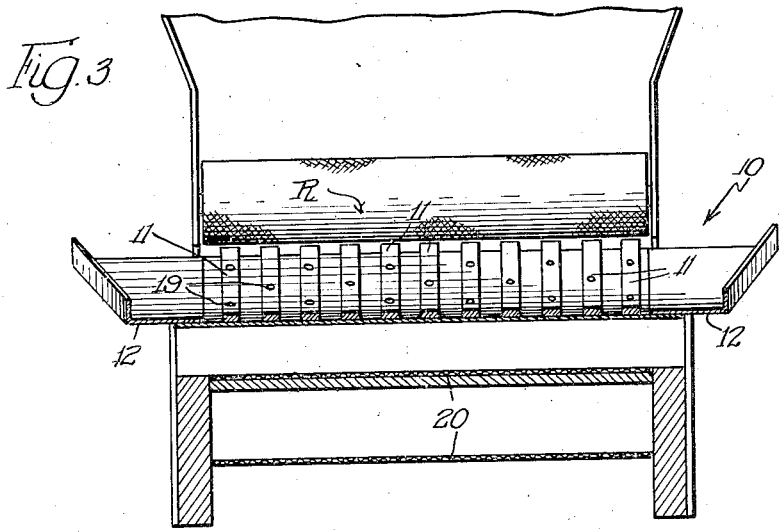
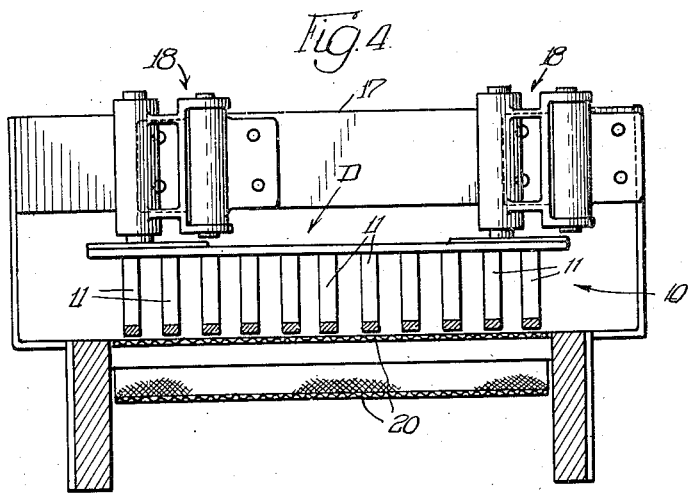
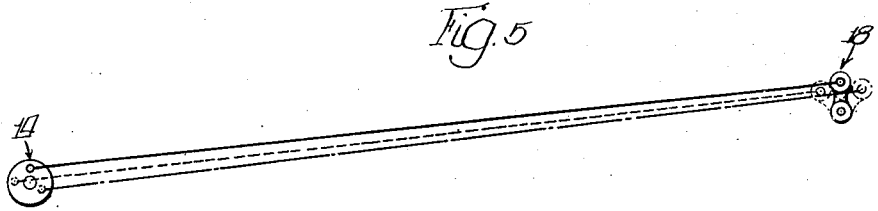
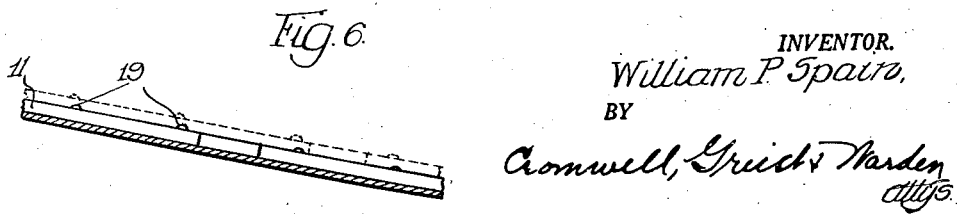
INVENTOR.
William P. Spain,
BY
Cromwell, Greist & Warden
ATTYS.

Patented Dec. 14, 1948

2,456,031

UNITED STATES PATENT OFFICE 2,456,031

ARTICLE ARRANGING AND ADVANCING CONVEYER MECHANISM

William P. Spain, Villa Park, Ill., assignor to E. J. Brach & Sons, Chicago, Ill., a corporation of Illinois Application April 10, 1946, Serial No. 661,155

6 Claims. (Cl. 198—30)

This invention relates to improvements in machines for handling edible commodities. More particularly, it pertains to a device for handling such edible commodities as, for example, candy centers to align and advance them in orderly spaced apart rows.

A principal object of the invention is the provision of a device for advancing edible units, such as candy centers, by simultaneously arranging them in orderly rows and continuously giving them a forward thrust in the direction of the discharge end of the device.

More specifically, an object of the invention is the provision of a device for arranging and advancing a plurality of candy centers, or bars, in spaced apart rows, utilizing a frame having spaced apart guide members longitudinally mounted therein, the frame having an inclined receiving end for such units between which the guide members are similarly inclined, and a discharge end therefor, and means connected to the receiving end simultaneously to impart a sidewise movement and forward thrust to align the candies in spaced apart rows between the guide members and to advance them toward the discharge end of the frame.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a side elevational view, partly in section and with parts broken away, illustrating a preferred embodiment of the invention partly underlying a feeding hopper;

Fig. 2 is a plan view of Fig. 1 with the hopper removed;

Fig. 3 is a cross sectional elevational view of the device taken along the line 3—3 of Fig. 1 and looking in the direction of the arrows toward the receiving end of the device;

Fig. 4 is a view similar to Fig. 3 taken along the line 4—4 of Fig. 1 and looking in the direction of the arrows toward the discharge end of the device;

Fig. 5 is a diagrammatic representation of the movement of the device illustrating how the simultaneous sidewise and thrusting movement is imparted thereto; and Fig. 6 is a sectional view, with parts broken away, of an inclined portion of the receiving end of the frame illustrating the forward thrusting movement thereof whereby the units are advanced.

Referring more particularly to the drawings there is depicted generally at 10 a substantially elongated frame having a plurality of spaced apart parallel guide members 11 longitudinally mounted therein.

The frame has an inclined receiving end indicated generally at R between which the guide members 11 are similarly inclined. The other end of the frame constitutes a discharge end indicated at D.

A principal feature of the invention resides in means, preferably connected to the receiving end of the frame, simultaneously and continuously to impart a sidewise movement as well as a forward thrust to the frame so that edible units, such as candy centers or bars, are aligned in spaced apart rows between the guide members and to advance them toward the discharge end of the frame. The means for securing the particular sidewise movement and forward thrust may be said to include, in addition to the frame, a bed plate 12 secured to the under side of the inclined guide members 11 to prevent the units from passing therebetween, and which therefore aid in imparting the sidewise movement and a forward thrust to the candy centers.

In the preferred embodiment there is illustrated a structure 13 projecting rearwardly from the inclined receiving end R, and which is eccentrically mounted medially of the longitudinal axis of the frame as indicated at 14. The eccentric mounting is preferably driven by a motor 15 connected to a vertical shaft 16.

At the discharge end of the frame a supporting structure 17 is mounted in any suitable manner. Connected to this supporting structure is one or more hinged members indicated generally at 18, 18. While two are preferred as illustrated, it will be understood that one may be used in lieu thereof when disposed medially of the longitudinal axis of the frame and in alignment with the eccentric mounting 14.

Included among the means for obtaining the sidewise and thrusting movement are a plurality of upstanding elements 19, 19 mounted on the upper surfaces of the guide members 11.

The illustrated eccentric mounting at the receiving end of the frame, and the hinge mountings at the discharge end thereof, make it possible, in conjunction with the bed plate 12 and the upstanding members 19, to obtain the simultaneous and continuous sidewise movement and forward thrust of the candy bars to align them in spaced apart rows between the guide members and to advance them toward the discharge end of the frame. The eccentric 14 imparts a rotary movement in that area of the structure extending rearwardly from the receiving end of the frame, while the hingedly mounted discharge end permits a substantially reciprocatory action. These actions are schematically illustrated in Fig. 5. It should be understood that the movement of the frame, at the receiving end, transmitted by the eccentric need not necessarily be rotary. It might be elliptical or orbital and it is within the contemplation of the invention to utilize either movement so long as the rapid sidewise action and forward thrust is obtained whereby the edible units are simultaneously aligned in orderly spaced apart rows and carried toward the discharge end of the device in such positions. The forward thrusting movement of the candy centers is depicted in solid and dotted line positions in Fig. 6.

In conjunction with the frame there is utilized a conventional conveyor belt 20 disposed beneath the same. This belt may be separately driven from a roller 21, the upper flight thereof passing immediately beneath the guide members 11, around a nose bar 22 and back over an idler roller 23. The conveyor belt 20 is only necessary where the inclined receiving end does not extend entirely to the discharge end of the frame. That is, where the bottom of the inclined frame terminates approximately midway between the frame the conveyor is necessary to pick up the aligned and spaced apart candy pieces and continue to convey them between the uninclined portions of the guide members and carry them beyond the discharge end of the frame.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device for arranging and advancing a plurality of edible units in spaced apart rows comprising a frame having a plurality of spaced apart guide members longitudinally mounted therein, said frame having an inclined receiving end for said units between which said guide members are similarly inclined and secured and a discharge end therefor, and means connected to said receiving end simultanteously and continuously to impart a sidewise movement and forward trust to said units to align them in spaced apart rows between said guide members and to advance them toward the discharge end of the frame, said forward thrust being applied to said units by said inclined end.

2. In a device for arranging and advancing a plurality of edible units in spaced apart rows comprising a frame having a plurality of spaced apart guide members longitudinally mounted therein, said frame having an inclined receiving end for said units between which said guide members are similarly inclined and secured, and a discharge end therefor, and means connected to said receiving end simultaneously and continuously to impart a sidewise movement and forward thrust to said units to align them in spaced apart rows between said guide members and to advance them toward said discharge end of the frame, said frame including a bed plate secured to the under side of said inclined guide members to prevent said units from passing therebetween and to aid said means to import said sidewise movement and forward thrust to said units, said forward thrust being applied to said units by said inclined end.

3. In a device for arranging and advancing a plurality of edible units in spaced apart rows comprising an elongated frame having a plurality of spaced apart guide members longitudinally mounted therein, said frame having an inclined receiving end for said units between which said guide members are similarly inclined and secured, and a discharge end therefor, and means simultaneously and continuously to impart a sidewise movement and forward thrust to said units to align them in spaced apart rows between said guide members and to advance them toward the discharge end of the frame, said means including a structure projecting rearwardly from said inclined receiving end and being eccentrically mounted medially of the longitudinal axis of said frame, said forward thrust being applied to said units by said inclined end.

4. In a device for arranging and advancing a plurality of edible units in spaced apart parallel rows comprising a frame having a plurality of spaced apart parallel guide members longitudinally mounted therein, said frame having an inclined receiving end for said units between which said guide members are similarly inclined and secured, and a discharge end therefor, and means connected to said receiving end simultaneously and continuously to impart a sidewise movement and forward thrust to said units to align them in spaced apart parallel rows between said guide members and to advance them toward said discharge end of the frame, said frame including a supporting structure for the discharge end thereof to which said discharge end hingedly is mounted, said forward thrust being applied to said units by said inclined end.

5. In a device for arranging and advancing a plurality of edible units in spaced apart rows comprising a frame having a plurality of spaced apart guide members longitudinally mounted therein, said frame having an inclined receiving end for said units between which said guide members are similarly inclined and secured, and a discharge end therefor, and means connected to said receiving end simultaneously and continuously to impart a sidewise movement and forward thrust to said units to align them in spaced apart rows between said guide members and to advance them toward said discharge end of the frame, said inclined guide members each including a plurality of upstanding elements to deflect said units between said members as the same are being moved sidewise and in a forwardly thrusted direction to align them between said guide members, said forward thrust being applied to said units by said inclined end.

6. In a device for arranging and advancing a plurality of edible units in spaced apart rows comprising a frame having a plurality of spaced apart guide members longitudinally mounted therein, said frame having an inclined receiving end for said units between which said guide members are similarly inclined and secured, and a discharge end therefor, and means connected to said receiving end simultaneously and continuously to impart a sidewise movement and forward thrust to said units to align them in spaced apart rows between said guide members and to advance them toward said discharge end of the frame, and a conveyor disposed beneath said frame to advance said aligned units from said inclined end past the discharge end thereof, said forward thrust being applied to said units by said inclined end.

WILLIAM P. SPAIN.

REFERENCES CITED

The following references are of record in the file of this patent:

UNITED STATES PATENTS

| Number | Name | Date |
|---|---|---|
| 1,459,367 | Hawes | June 19, 1923 |
| 1,755,721 | Winkler et al. | Apr. 22, 1930 |